United States Patent
Brosig et al.

(10) Patent No.: US 8,793,897 B2
(45) Date of Patent: Aug. 5, 2014

(54) PROCESS AND DEVICE FOR STABILISING, COOLING AND DEHUMIDIFYING GYPSUM PLASTER

(75) Inventors: Alfred Brosig, Salzgitter (DE); Gunther Schafer, Neuenstein-Obergeis (DE)

(73) Assignee: Grenzebach BSH GmbH, Bad Hersfeld (DE)

( * ) Notice: Subject to any disclaimer, the term of this patent is extended or adjusted under 35 U.S.C. 154(b) by 328 days.

(21) Appl. No.: 13/206,935

(22) Filed: Aug. 10, 2011

(65) Prior Publication Data

US 2012/0060723 A1 Mar. 15, 2012

Related U.S. Application Data

(60) Provisional application No. 61/372,645, filed on Aug. 11, 2010.

(51) Int. Cl.
 *F26B 3/02* (2006.01)
(52) U.S. Cl.
 USPC .......... 34/303; 34/304; 34/305; 34/578; 34/60; 34/168; 62/62; 62/371; 423/171; 431/126; 106/772
(58) Field of Classification Search
 USPC .......... 34/380, 381, 302, 303, 304, 305, 166, 34/168, 578, 60; 62/3.3, 4, 66, 67, 62, 62/340, 371; 431/2, 4, 5, 126, 253; 423/171, 517; 106/676, 695, 772
 See application file for complete search history.

(56) References Cited

U.S. PATENT DOCUMENTS

| | | | | |
|---|---|---|---|---|
| 3,829,280 | A | 8/1974 | Jenne et al. | |
| 4,120,737 | A * | 10/1978 | Berrie et al. | 106/772 |
| 5,320,677 | A * | 6/1994 | Baig | 106/780 |
| 5,908,499 | A * | 6/1999 | Tourangeau | 106/486 |
| 6,054,101 | A | 4/2000 | Langfeldt et al. | |
| 7,765,813 | B2 | 8/2010 | Bolind et al. | |
| 2003/0061972 | A1* | 4/2003 | Key, Jr. | 106/772 |
| 2006/0010711 | A1* | 1/2006 | Falinower | 34/443 |
| 2006/0010895 | A1 | 1/2006 | Bolind et al. | |
| 2009/0101741 | A1 | 4/2009 | Gocke | |
| 2009/0151187 | A1* | 6/2009 | Falinower | 34/173 |

FOREIGN PATENT DOCUMENTS

| | | |
|---|---|---|
| AT | 412 342 B | 1/2005 |
| CH | 276080 | 6/1951 |
| CH | 584 168 A5 | 1/1977 |
| DE | 902 595 | 1/1954 |

(Continued)

OTHER PUBLICATIONS

Sep. 3, 2013 Eurasian Search Report (with partial English-language translation).

(Continued)

*Primary Examiner* — Steve M Gravini
(74) *Attorney, Agent, or Firm* — Oliff PLC

(57) ABSTRACT

In a process for the continuous conditioning of gypsum plaster, the gypsum plaster is passed from a calcination facility connected upstream to a gypsum plaster cooler in the form of particles. In the gypsum plaster cooler, soluble calcium sulphate anhydrite is initially converted to calcium sulphate hemi-hydrate and calcium sulphate dihydrate to calcium sulphate hemi-hydrate, and crystal defects are eliminated. Subsequently, the gypsum plaster is brought into contact with ambient air and dehumidified by the latter and thereby simultaneously cooled indirectly.

23 Claims, 2 Drawing Sheets

(56) References Cited

FOREIGN PATENT DOCUMENTS

Figure 1:
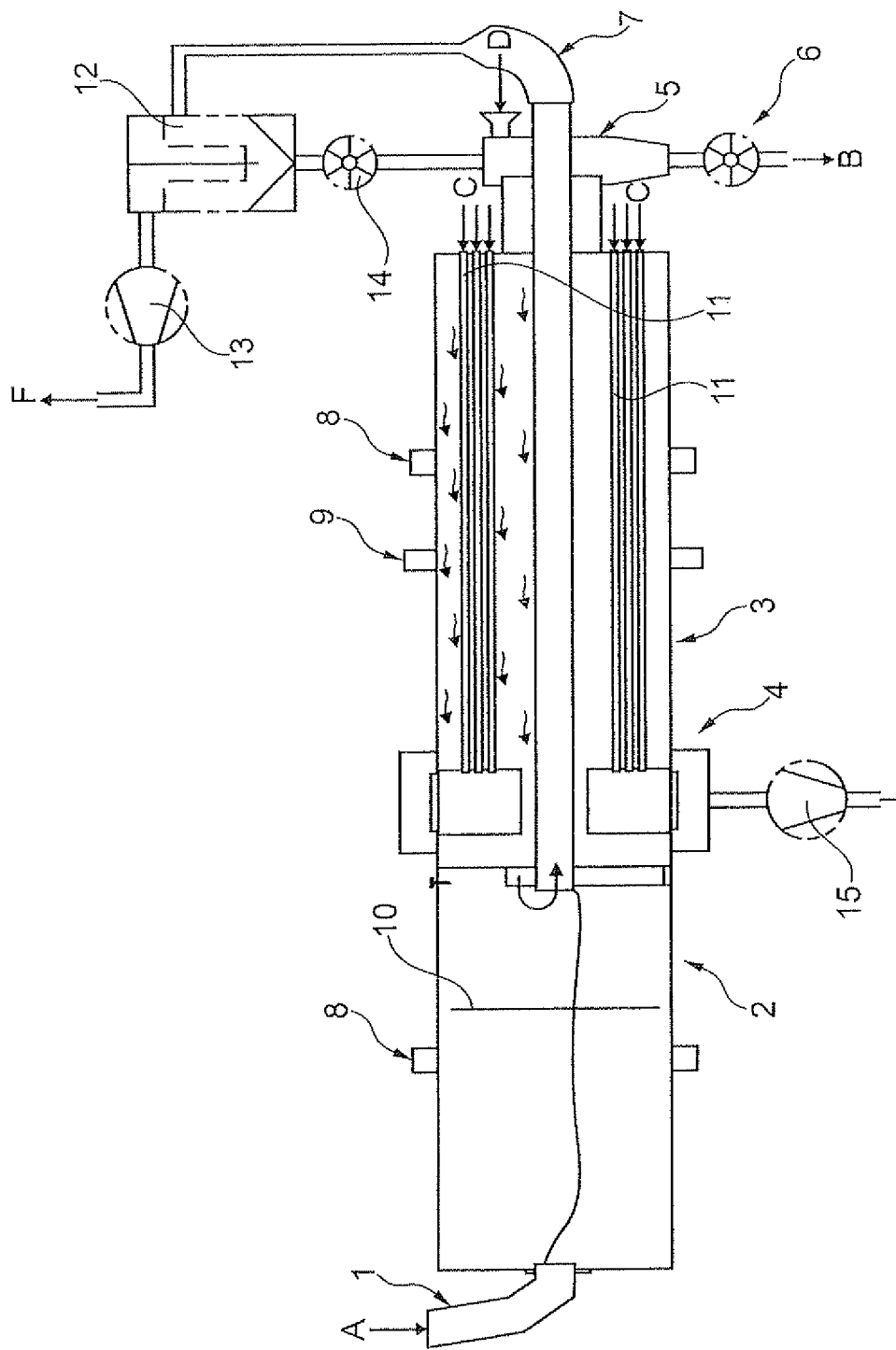

| | | | |
|---|---|---|---|
| DE | 1 164 917 | | 3/1964 |
| DE | 1 767 937 | * | 3/1972 |
| DE | 30 02 025 A1 | | 7/1981 |
| DE | 196 06 075 A1 | | 8/1997 |
| DE | 10 2006 023 677 A1 | | 11/2007 |
| EP | 1 547 984 A1 | | 6/2005 |
| EP | 1 547 984 B1 | | 8/2006 |
| EP | 1 747 814 A1 | | 1/2007 |
| EP | 2149542 A2 * | 2/2010 | ................ C05C 3/00 |
| FR | 2.213.918 | | 11/1973 |
| GB | 577970 | * | 6/1946 |
| JP | 48-56719 | | 8/1973 |
| JP | 52-4520 | | 2/1977 |
| JP | A-56-59658 | | 5/1981 |
| RU | 2 377 482 C2 | | 12/2009 |
| WO | WO 2008/074137 A1 | | 6/2008 |
| WO | WO 2009/135688 A1 | | 11/2009 |

OTHER PUBLICATIONS

Dec. 22, 2011 Written Opinion issued in International Patent Application No. PCT/EP2011/004006 (with translation).
Dec. 22, 2011 International Search Report issued in International Patent Application No. PCT/EP2011/004006 (with translation).
German Search Report issued in Application No. 10 2010 033 988.1; Dated Jul. 14, 2011 (With Translation).
Translation of Mar. 4, 2014 Notification of Reasons for Refusal issued in Japanese Patent Application No. 2013-523533.

* cited by examiner

PROCESS AND DEVICE FOR STABILISING, COOLING AND DEHUMIDIFYING GYPSUM PLASTER

The present invention relates to a process for the continuous conditioning of gypsum plaster.

Gypsum is a technical, mineralogical term for the chemical compound calcium sulphate dihydrate ($CaSO_4.2H_2O$). By supplying it with thermal energy, gypsum loses 1½ molecules of its chemically bound water of crystallisation per formula unit; the calcium sulphate dihydrate is converted into calcium sulphate hemi-hydrate $CaSO_4.½H_2O$.

There are two technical forms of calcium sulphate hemi-hydrate; a distinction is frequently made between them for practical purposes as the alpha-modification and the beta-modification, even though they are identical from the chemical-mineralogical point of view. If the thermal energy is supplied at atmospheric pressure, the beta-modification of calcium sulphate hemi-hydrate is obtained. The beta-modification is the main component of gypsum plaster which has great importance as a binder for the production of plaster of Paris and gypsum plaster board.

The production of the alpha-modification of calcium sulphate hemi-hydrate takes place from supersaturated aqueous solutions, i.e. in solutions of electrolytes consisting of acids and salts or at elevated temperature and elevated vapour pressure in autoclaves. These conversions are usually carried out by employing additives which influence the morphology of the crystals being formed in a desirable manner.

The present invention relates to stabilising, cooling and dehumidifying gypsum plaster with the aim of producing predominantly the beta-modification of calcium sulphate hemi-hydrate.

The term commonly used in the technical field for the removal of water bound in gypsum in the crystalline form by supplying thermal energy is "calcination". There exist different processes for the calcination of gypsum which, depending on the supply of thermal energy, are divided into indirect and direct calcination processes. Kettles and rotary tube calcinators belong to the category of indirect calcination processes where the gypsum is not in contact with combustion gas. If the gypsum to be calcined is in contact with combustion gas, a direct calcination process is involved. Direct processes include grinding calcining, calcining in the rotary tube kiln, calcining in a drying duct and related devices.

The characteristics of gypsum plaster obtained by different calcination processes differ depending on the technical process conditions. Thus gypsum plaster calcined in a kettle or rotary tube calcinator possesses a higher phase stability. The reason for this is the lower thermal load per unit of time. In the case of indirect processes, the time required for calcining the gypsum may be up to several hours. In a grinding calcining process or during calcining in a drying duct, on the other hand, the contact time with the combustion gas is maximum 20 to 30 seconds. Direct calcining processes are increasingly used on an industrial scale because the equipment is more compact and consequently more cost-effective, and because the thermal efficiency is greater. Moreover, the setting time of the gypsum plaster is shorter, which facilitates the industrial scale production of gypsum plaster board.

The desired phase for the production of plaster of Paris and gypsum plaster board is calcium sulphate hemi-hydrate $CaSO_4.½H_2O$ which is produced technically at a process temperature of 150° C. to 170° C. When the process temperature is within a range of 180° C. to approximately 300° C., the soluble calcium sulphate anhydrite (anhydrite III) is formed. The soluble anhydrite is free from water bound in the crystalline form. However, in the presence of water or even of water vapour, soluble anhydrite is converted to calcium sulphate hemi-hydrate. This is a reversible exothermic conversion during which thermal energy of 210 kJ to 225 kJ per kg of calcium sulphate hemi-hydrate is released.

If the process temperature exceeds 300° C., calcium sulphate anhydrite of low solubility is formed. This phase is undesirable in gypsum plaster. During normal use of gypsum plaster, anhydrite of low solubility does not participate in the setting process. However, thermal energy was required for the conversion to anhydrite of low solubility which energy has no benefit for the gypsum plaster produced. Basically, the presence of anhydrite of low solubility in gypsum plaster points to an uneconomic calcination process.

Technically calcined gypsum plaster is rarely a pure phase product; instead, its composition consists of up to four calcium sulphate phases. The desirable phase is that of calcium sulphate hemi-hydrate $CaSO_4.½H_2O$. The core of larger gypsum plaster particles may contain residues of calcium sulphate dihydrate (gypsum) $CaSO_4.2H_2O$ which have not received a sufficient amount of thermal energy. On the other hand, relatively small gypsum plaster particles may already exhibit the phase of soluble calcium sulphate anhydrite $CaSO_4$. The presence of calcium sulphate dihydrate and of soluble calcium sulphate anhydrite in gypsum plaster influences the setting time of gypsum plaster and its water demand. It is the aim to eliminate both phases or to reduce them at least in a stable manner to as low a proportion as possible.

Just as important as the degradation of soluble calcium sulphate hemi-hydrate for the water demand of the gypsum plaster is the elimination of defects in primary hemi-hydrate which provides the main mass of calcined gypsum plaster before conditioning. Intracrystalline defects, surface defects and inter-crystalline stresses occur between the hemi-hydrate crystals among each other, as well as between hemi-hydrate crystals and the other three calcium sulphate phases.

In the past, considerable efforts were made to convert soluble calcium sulphate anhydrite to calcium sulphate hemi-hydrate. In EP 1 547 984 A1, a method is described by which gypsum plaster is moistened in a rotating device in order to convert soluble calcium sulphate anhydrite to calcium sulphate hemi-hydrate. For this purpose, water or steam is supplied. All external equipment surfaces which are in contact with the gypsum plaster are heated to more than 100° C. Cooling of the gypsum plaster is not provided.

In WO 2008 074137 A1, the supply of steam to condition gypsum plaster is also described. Gypsum plaster which is present in a static device is brought into contact with steam. The steam pressure within the device is set at above atmospheric pressure. Cooling and dehumidification of the gypsum plaster are not provided. The process of phase stabilisation is discontinuous.

According to WO 2009 135688 A1, gypsum obtained by flash calcination in a reaction vessel is post-calcined by supplying hot moist gas, the period of residence in the reaction vessel being much longer than during prior flash calcination. In this process, cooling and dehumidification of the gypsum plaster are again not provided.

In the above-mentioned processes, water or steam is introduced into the reaction chamber concerned in order to decompose the soluble calcium sulphate anhydrite. The same procedure is also used in WO 2009 135688 A1. However, in this case, the steam is present in the moist gas in the super-heated form. Depending on the process conditions of the calcination process, the purity and surface humidity of the gypsum and the steam content of the combustion gas, the steam content of the moist gas is less than 30% (by volume).

None of the above-mentioned processes provides measures for dehumidifying the gypsum plaster after the treatment according to the invention. Even if thermal energy is supplied for drying of the gypsum plaster, as is the case according to EP 1 547 984 A1, residues of super-heated steam remain in the gypsum plaster unless a carrier medium such as air can take up these steam residues. If such gypsum plaster gets into contact with surfaces in the following conveying devices whose temperature is below that of the water vapour dew point, condensation necessarily occurs. There is a risk of gypsum plaster particles being bound in condensate at these contact surfaces, thereby causing the formation of deposits.

The gypsum plaster obtained according to one of the processes detailed above is used in particular for the production of gypsum plaster board. Gypsum plaster board is the most widely used construction element based on gypsum. A gypsum core is embedded between two layers of cardboard, the gypsum core being completely enclosed by the two cardboard layers. During the production of the gypsum core, varying phases in the gypsum plaster result in varying water demand and changed setting behaviour. In addition to the main components of gypsum plaster and water, a plurality of additives are introduced into a mixer in order to achieve the desired setting of the gypsum plaster. Additives such as dispersing agents, accelerators and retarding agents bring about the desired setting behaviour. The greater the stability of the gypsum plaster characteristics, the lower is the water and additive demand. Here lies the potential for an enormous reduction of costs by way of a phase-stable gypsum plaster.

Setting of gypsum plaster is optimal if the temperature of a suspension of gypsum plaster and water is 35° C. and not higher than 40° C. For this reason, the gypsum plaster must be cooled to approximately 80° C. in order to achieve an optimum suspension temperature.

The gypsum industry uses direct and indirect cooling systems for gypsum plaster. Direct cooling systems are based on direct contact with cooling air in drying ducts and fluidised bed coolers. Most widely used, however, is an indirect cooling system in which a rotary tube cooler is used. It is known that, apart from cooling the gypsum plaster, a rotary tube cooler also provides a certain reduction of soluble calcium sulphate anhydrite. However, practically no reduction of calcium sulphate dihydrate takes place because the exothermic energy released during the conversion of soluble calcium sulphate anhydrite to calcium sulphate hemi-hydrate is taken up by the cooling air.

It is an object of the process according to the invention to provide a process and a device for the production of phase-stable, dehumidified and cooled gypsum plaster which is able to take effect in an energy saving, cost effective and technically reliable manner.

According to the invention, this object is achieved in a process for continuously conditioning gypsum plaster by passing the gypsum plaster in the form of particles from a calcination facility connected upstream to a gypsum plaster cooler, wherein initially, in this cooler, soluble calcium sulphate anhydrite is converted to calcium sulphate hemi-hydrate and calcium sulphate dihydrate to calcium sulphate hemi-hydrate, and crystal defects are eliminated, and subsequently the gypsum plaster is brought into contact with ambient air and dehumidified by the latter and thereby simultaneously cooled indirectly.

The invention provides a continuous process for stabilising, cooling and dehumidifying gypsum plaster without water or water vapour having to be supplied for the purpose of stabilisation. Moreover, no additional thermal energy is required to dehumidify the gypsum plaster. As a result of the fact that the gypsum plaster supplied from the calcination facility first resides in a first zone of the gypsum plaster cooler in which a reduction of calcium sulphate dihydrate to calcium sulphate hemi-hydrate takes place, the exothermic energy released during the conversion of soluble calcium sulphate anhydrite to calcium sulphate hemi-hydrate being taken up, no supply of thermal energy from outside is required for this process, in contrast to facilities for producing gypsum plaster according to the state of the art.

Advantageous further developments of the invention result from the sub-claims, the description and the figures.

Preferably, it is provided that the gypsum plaster is introduced into the gypsum plaster cooler with a density of 0.7 to 0.9 kg/dm$^3$.

Advantageously, it is provided that the gypsum plaster is introduced into the reaction vessel together with process gas entrained from the calcination system. The process gas preferably has a density of 0.65 to 0.7 kg/m$^3$.

Preferably, the process gas is introduced with a water vapour content of 0.25 to 0.40 kg/m$^3$, based on the volume of the process gas under standard conditions.

Here, the gypsum plaster is first introduced through a stabilisation zone arranged in the rotary tube cooler.

Advantageously, it is provided that the gypsum plaster remains in the stabilisation zone for ten to fifteen minutes. The stabilisation zone is structured in such a way that water vapour released in it through phase exchange in the gypsum plaster is discharged by the supply of ambient air into a cooling zone arranged downstream of the stabilisation zone in the direction of flow of the gypsum plaster.

Preferably, the ambient air is passed counter-currently to the direction of flow of the gypsum plaster over the latter to absorb water vapour in order to ensure a satisfactory water absorption and a satisfactory heat transfer. It has proven to be particularly advantageous if the ambient air is passed into the cooling zone at a flow rate of less than 0.1 m/s.

Preferably, the ambient air supplied is heated to a temperature of more than 80° C. through contact with the gypsum plaster.

Again advantageously, the ambient air is deflected into the direction of flow of the gypsum plaster, i.e. by 180', at a junction between the stabilisation zone and the cooling zone, and then passed out again of the gypsum plaster cooler. By reversing the direction of flow, the ambient air is prevented from withdrawing water vapour from the stabilisation zone where this is required for the phase stabilisation of the phases of the gypsum plaster.

In the cooling zone, the gypsum plaster is additionally cooled indirectly by ambient air conducted in cooling tubes. The ambient air used for this indirect cooling is heated during this process to a temperature of up to 100° C.

A particular advantage of the process according to the invention is that the ambient air heated in the cooling tubes as cooler discharge air can be passed again to at least one burner of the calcination facility as preheated combustion air, thus saving fuel energy.

According to the invention, phase stabilisation, dehumidification and cooling of the gypsum plaster thus take place in two zones; firstly, soluble calcium sulphate anhydrite is converted to calcium sulphate hemi-hydrate in a stabilisation zone by taking up water vapour and giving off exothermic conversion energy; by utilising the released exothermic energy, calcium sulphate dihydrate is converted to calcium sulphate hemi-hydrate, and defects in the primary calcium sulphate hemi-hydrate are eliminated. Subsequently, the gypsum plaster phase-stabilised in this way is dehumidified in the cooling zone in direct contact with ambient air and cooled in indirect contact with ambient air.

According to the invention, water vapour from the process gas of a calcination system connected upstream, which is present between the gypsum particles, activates the conversion of soluble calcium sulphate anhydrite to calcium sulphate hemi-hydrate. Subsequently, water vapour from water bound in a crystalline manner to the calcium sulphate dihydrate, which is released during the conversion to calcium sulphate hemi-hydrate, continues the conversion of soluble calcium sulphate anhydrite to calcium sulphate hemi-hydrate.

The stabilisation of the gypsum plaster thus takes place in a first zone of the device. Cooling and dehumidification take place in a second zone.

The invention also relates to a device for carrying out the process.

According to the invention, the device is characterised in that it comprises a gypsum plaster cooler which is configured as a rotary tube cooler and comprises a separate stabilisation zone and a separate cooling zone.

Advantageously, a circumferential seal, in particular at least a restrictor plate (10), is provided between the stabilisation zone and the cooling zone. As an example, several vertical restrictor plates are incorporated which avoid a short circuit of the gypsum plaster flow from the gypsum plaster input chute to the outlet of the stabilisation zone.

Preferably, cooling tubes are provided in the cooling zone for indirect heat exchange between the gypsum plaster and the ambient air supplied as cooling air.

It has also proved advantageous if a dehumidification tube is provided in the cooling zone, in particular in its central axis.

Advantageously, an input chute with a seal is provided centrally in the front plate of the rotary tube cooler for introducing the gypsum plaster into the stabilisation zone.

A simple evacuation of the finished gypsum plaster is made possible by joining a gypsum plaster discharge housing and a cellular wheel sluice to the cooling zone for evacuating the gypsum plaster.

Here it can be provided that the bearing of the rotary tube cooler is configured with raceways and roller bearings, one having the form of a fixed bearing and one of a floating movable bearing to compensate for thermal expansion. The drive of the rotary tube cooler has the form of e.g. a chain drive or a gear drive.

Preferably, the rotary tube cooler rotates at a rate of three to eight revolutions per minute. According to the configuration of the rotary tube cooler according to the invention, a thermal insulation is necessary neither for the stabilisation zone nor for the cooling zone.

Figure 2:
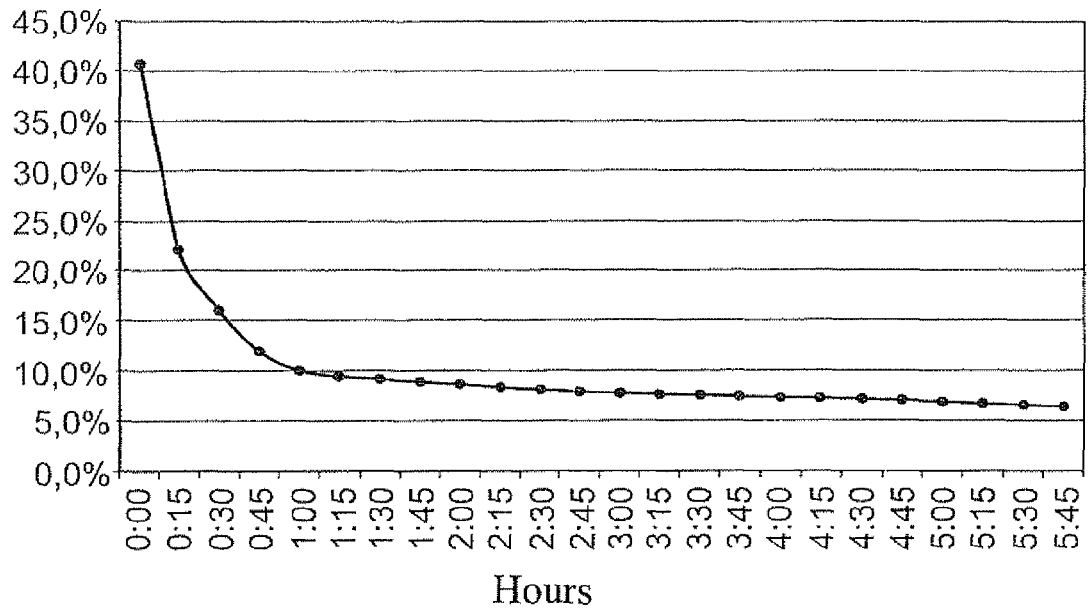
Figure 3:
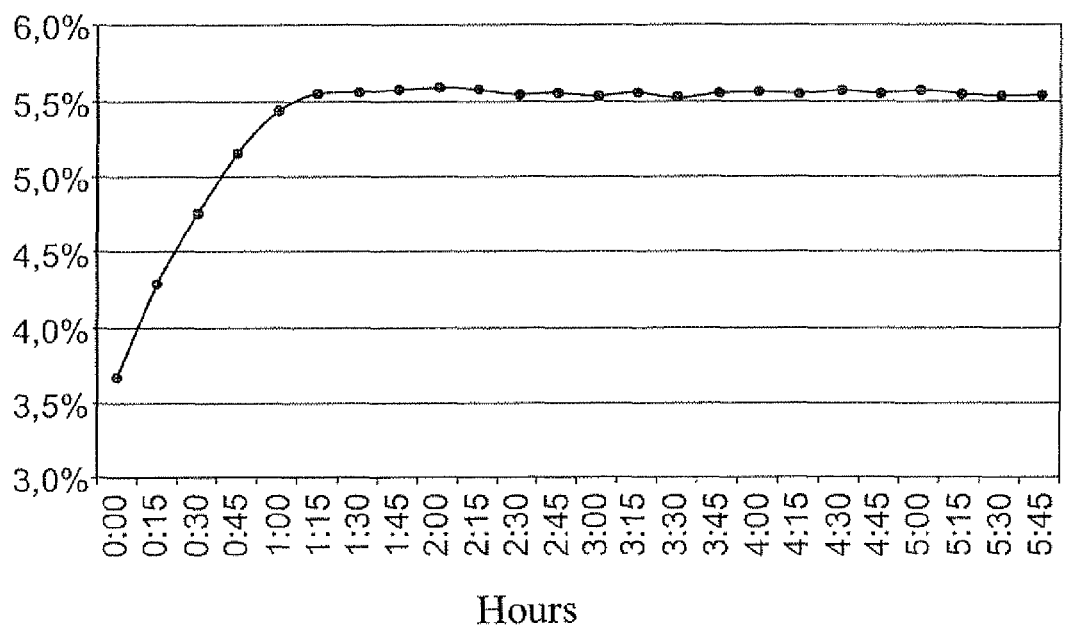

The invention will now be described in further detail with reference to one exemplary embodiment. In detail:

FIG. 1 shows a gypsum plaster cooler according to the invention consisting of a stabilisation zone and a cooling zone with peripheral operating units, FIG. 2 shows the content of anhydrite III of the gypsum plaster in the starting state of a gypsum cooler having a stabilisation zone as a function of time and FIG. 3 shows the content of water of crystallisation in the starting state of a gypsum cooler having a stabilisation zone as a function of time.

The gypsum plaster cooler shown in FIG. 1 is characterised above all by the fact that it consists of a stabilisation zone 2 and a cooling zone 3.

An indirectly cooled horizontal rotary tube cooler commonly used in practice has been modified according to the invention by integrating a stabilisation zone 2. This stabilisation zone 2 has a restrictor plate 10 in its interior to prevent the calcined gypsum plaster A that has been introduced from flowing to the outlet of stabilisation zone 2 in a short circuit. It is well known that freshly calcined gypsum plaster A is in a fluidised state. In this fluidised state, the gypsum plaster floats on the gypsum plaster already present in the stabilisation zone 2. The restrictor plate prevents this short circuit and the introduced calcined gypsum plaster A is mixed with the gypsum plaster already present in the stabilisation zone 2.

The fluidised state of the gypsum plaster with the associated good flow properties is also the reason why a gypsum plaster input chute 1 at the inlet to the stabilisation 2 is sufficient. A feed screw is not required.

The calcined gypsum plaster A that has been introduced has a density of 2.55 to 2.65 kg/dm$^3$, depending on the phase composition. The bulk density of the calcined gypsum plaster A, however, is only 0.7 to 0.9 kg/dm$^3$. The gypsum plaster particles are surrounded by process gas with a low density of 0.65 to 0.7 kg/m$^3$. The process gas originates from the calcination system installed upstream. The water vapour content of the process gas is between 0.25 and 0.4 kg/m', based on the volume of the process gas under standard conditions.

This low mass of water vapour is sufficient to initiate the process of phase stabilisation. An additional supply of water or water vapour from outside is not required. The soluble calcium sulphate anhydrite reacts with the water vapour present and is converted to calcium sulphate hemi-hydrate. During this process, exothermic energy of 210 to 225 kJ/kg of calcium sulphate hemi-hydrate is released.

It is not necessary to heat the jacket surface of the stabilisation zone 2 externally, as is suggested in patent application EP 1 547 984 B1, Even a thermal insulation of the jacket surface can be dispensed with. Although it is possible for the temperature of the inside surfaces of the jacket to fall below the dew point, since the process gas surrounding the gypsum plaster particles has a dew point temperature of more than 70° C., this decrease to below the dew point is advantageous since the conversion of soluble calcium sulphate anhydrite to calcium sulphate hemi-hydrate is accelerated. There is no risk of deposits of gypsum plaster particles in the condensate forming on the inside surface of the jacket since the moving gypsum plaster in the rotating stabilisation zone 2 prevents deposits.

The heat from the conversion of calcium sulphate dihydrate to calcium sulphate hemi-hydrate amounts to 570 to 580 kJ/kg calcium sulphate hemi-hydrate. The exothermic conversion energy from soluble calcium sulphate anhydrite to 1 kg calcium sulphate hemi-hydrate has the potential of converting calcium sulphate dihydrate (gypsum) to 0.35 to 0.4 kg of calcium sulphate hemi-hydrate. During this process, 1½ parts of the water bound in a crystalline manner in the calcium sulphate dihydrate are released. Only ½ part of this water bound in a crystalline manner is used for the further conversion of soluble calcium sulphate anhydrite. This crystalline water is released until the proportion of calcium sulphate dihydrate in the gypsum plaster is spent completely. A mass of water, water vapour or water vapour containing process gas supplied from outside is not necessary.

The residence time of the calcined gypsum plaster A in the stabilisation zone 2 is 10 to 15 minutes. The phases of the gypsum plaster have largely stabilised after an operating time of only approximately one hour (compare FIGS. 1 and 2).

The gypsum plaster cooler is driven by means of a chain drive 9 or a gear drive 9. The raceways 8 are seated on roller bearings, one of the bearings being configured as a fixed bearing. The floating movable bearing compensates for any changes in length caused by thermal expansion.

The speed of rotation of the gypsum plaster cooler is three to eight revolutions per minute. The gypsum plaster present in the stabilisation zone 2 and the cooling zone 3 is gently moved during this process. The friction between the gypsum plaster particles caused by this movement has a positive effect on the water demand of the gypsum plaster.

The surface of a gypsum plaster particle is rough and fissured after calcination. This applies in particular to gypsum plaster calcined in a direct calcination system. Without treating the particle surfaces, the water demand is higher for producing a suspension using the gypsum plaster. As a result of the movement and friction of the gypsum plaster in the rotating gypsum plaster cooler having the stabilisation zone 2, the particle surface is smoothed. During this process, fine gypsum plaster particles become detached and have a positive effect on the particle distribution of the gypsum plaster. These fine particles occupy the space between larger gypsum plaster particles, thus reducing the water demand for filling the interstices.

As a result of the high thermal load, in particular in direct calcination processes, the gypsum plaster particles are subject to stress and exhibit intercrystalline defects. When these gypsum plaster particles come into contact with water, increased grain decomposition takes place, which leads to an increased water demand. These interferences and defects affect both the soluble calcium sulphate anhydrite and the primary calcium sulphate hemi-hydrate. Apart from the conversion of soluble calcium sulphate anhydrite to calcium sulphate hemi-hydrate in the stabilisation zone 2, mainly the intracrystalline stresses and surface defects of the primary hemi-hydrate formed during calcination are eliminated. Both conversion processes together with the elimination of intercrystalline stresses minimise the grain decomposition.

As mentioned above, the water vapour content in the stabilisation zone 2 is increased by the phase exchange from calcium sulphate dihydrate to calcium sulphate hemi-hydrate by using the exothermic heat from the conversion of soluble calcium sulphate anhydrite to calcium sulphate hemi-hydrate. The proportion of water vapour not required for the conversion of soluble calcium sulphate anhydrite to calcium sulphate hemi-hydrate should be removed. Should this excess water vapour reach the cooling zone 3, condensation would arise on the cooling tubes as a result of the decrease in temperature to below the dew point. It is generally known that a finely particular solid in contact with water tends to form deposits on contact surfaces. Fine gypsum plaster particles would be incorporated into the surface humidity and coat the cooling tubes. As a result, the passage of heat through the cooling tubes would be affected.

The best carrier for dehumidifying gypsum plaster is atmospheric ambient air. The dehumidification air D passes into a gypsum plaster discharge housing 5 and from there into the cooling housing 3. The dehumidification air D is heated up to as much as 80° C. in counter flow to the gypsum plaster. The flow rate in the cooling zone 3 is less than 0.1 m/s. This heated stream of air has the potential of absorbing even minute quantities of water vapour from the gypsum plaster. At the outlet of stabilisation zone 2, the direction of flow of the dehumidification air D turns by 180°. This ensures that the dehumidification air D does not entrain water vapour from the stabilisation zone 2 since the water vapour is required there for phase stabilisation. Through a central dehumidification tube 7, the dehumidification air F loaded with water vapour passes to an external dust filter 12. A blower 13 transports the dust removal air F through the gypsum plaster cooler and the dust filter 12. Via a cellular wheel sluice 14, gypsum dust contained in the dehumidification air F is returned into the gypsum plaster cooler.

Atmospheric ambient air is also used for the cooling of the gypsum plaster. This cooling air C is sucked into a plurality of cooling tubes 11 present in the cooling zone 3. In indirect heat exchange and in counter flow, the gypsum plaster releases its heat to the cooling air C. During this process, the cooling air C is heated up to as much as 100° C. The heated cooling air C passes from the cooling tubes 11 into a cooling air manifold housing 4 where it is siphoned off using a blower 15. The heated cooler exhaust air E is free from dust and can consequently be returned to the burners in the calcination facility as preheated combustion air.

The phase-stabilised, cooled and dehumidified gypsum plaster B is continuously discharged from the cooling zone 3 by means of lifting scoops (not shown). The gypsum plaster can then be taken from the outlet through the gypsum plaster discharge housing 5 and an external cellular wheel sluice 6.

The continuous process according to the invention and/or the device according to the invention guarantees that the production of phase-stable, cooled and dehumidified gypsum plaster takes place in an energy-saving and operationally safe manner supplying gypsum plaster of high quality.

In the stabilisation zone 2, the calcium sulphate anhydrite content of the gypsum plaster is reduced, in the start-up state of the gypsum cooler, after only one and a half hours to a proportion in percent by weight of less than 10% (FIG. 2), in a way that, in continuous operation, the gypsum plaster needs to remain in the stabilisation zone 2 for less than a quarter of an hour in order to reduce the proportion of anhydrite III to this value. Correspondingly, the content of water of crystallisation bound to the calcium sulphate hemi-hydrate increases in parallel (FIG. 3), which is also indicated in percent by weight.

LIST OF REFERENCES 1 gypsum plaster input chute
2 stabilisation zone
3 cooling zone
4 cooling air manifold housing
5 gypsum plaster discharge housing
6 cellular wheel sluice
7 dehumidification tube
8 raceways
9 chain drive or gear drive
10 restrictor plate
11 cooling tubes
12 dust filter
13 blower
14 cellular wheel sluice
15 blower
A calcined gypsum plaster at the inlet to the rotary tube cooler
B gypsum plaster at the outlet of the rotary tube cooler (phase-stable, cooled, dehumidified)
C cooling air
D dehumidification air
E cooler exhaust air
F dehumidification exhaust air

The invention claimed is:
1. Process for the continuous conditioning of gypsum plaster which is passed in the form of particles from a calcination facility connected upstream to a gypsum plaster cooler, wherein initially, in this cooler, soluble calcium sulphate anhydrite is converted to calcium sulphate hemi-hydrate and calcium sulphate dihydrate to calcium sulphate hemi-hydrate, and crystal defects are eliminated, and subsequently the gypsum plaster is brought into contact with ambient air and dehumidified by the latter and thereby simultaneously cooled indirectly.

2. Process according to claim 1,
wherein
the gypsum plaster is introduced with a density of 0.7 to 0.9 kg/dm$^3$.

3. Process according to claim 1,
wherein
the gypsum plaster is introduced into the gypsum plaster cooler together with process gas entrained from the calcination system.

4. Process according to claim 3,
wherein
the process gas is introduced with a density of 0.65 to 0.7 kg/m$^3$.

5. Process according to claim 3,
wherein
the process gas is introduced with a water vapour content of 0.25 to 0.40 kg/m$^3$, based on the volume of the process gas under standard conditions.

6. Process according to claim 1,
wherein
the gypsum plaster is cooled indirectly in a gypsum plaster cooler configured as a rotary tube cooler.

7. Process according to claim 6,
wherein
the gypsum plaster is first passed through a stabilisation zone arranged in the rotary tube cooler.

8. Process according to claim 7,
wherein
the gypsum plaster resides in the stabilisation zone for ten to fifteen minutes.

9. Process according to claim 7,
wherein
water vapour released in the stabilisation zone through phase exchange in the gypsum plaster is discharged by the supply of ambient air into a cooling zone arranged downstream of the stabilisation zone in the direction of flow of the gypsum plaster.

10. Process according to claim 9,
wherein
the ambient air is passed counter-currently to the direction of flow of the gypsum plaster over the latter to absorb water vapour.

11. Process according to claim 9,
wherein
the ambient air is passed into the cooling zone at a flow rate of less than 0.1 m/s.

12. Process according to claim 9,
wherein
the ambient air is heated to a temperature of more than 80° C. through contact with the gypsum plaster.

13. Process according to claim 9,
wherein
the ambient air is deflected into the direction of flow of the gypsum plaster at a junction between the stabilisation zone and the cooling zone and passed out of the gypsum plaster cooler.

14. Process according to claim 1,
wherein
the gypsum plaster is cooled in the cooling zone by ambient air conducted in cooling tubes.

15. Process according to claim 14,
wherein
the ambient air is heated to a temperature of up to 100° C.

16. Process according to claim 14,
wherein
the ambient air heated in the cooling tubes as cooler discharge air is passed to at least one burner of the calcination facility as preheated combustion air.

17. Device for carrying out a process according to claim 1,
wherein
it comprises a gypsum plaster cooler which is configured as a rotary tube cooler and comprises a separate stabilisation zone and a separate cooling zone.

18. Device according to claim 17,
wherein
a circumferential seal is provided between the stabilisation zone and the cooling zone.

19. Device according to claim 17,
wherein
in the cooling zone, cooling tubes are provided for indirect heat exchange between the gypsum plaster and the ambient air supplied as cooling air.

20. Device according to claim 17,
wherein
in the cooling zone, a dehumidification tube is provided.

21. Device according to claim 17,
wherein
an input chute with a seal is provided centrally in the front plate of the rotary tube cooler for introducing the gypsum plaster into the stabilisation zone.

22. Device according to claim 17,
wherein
a gypsum plaster discharge housing and a cellular wheel sluice are joined to the cooling zone for evacuating the gypsum plaster.

23. Device according to claim 17,
wherein
the rotary tube cooler rotates with three to eight revolutions per minute.

* * * * *